United States Patent [19]
Jones et al.

[11] Patent Number: 5,253,536
[45] Date of Patent: Oct. 19, 1993

[54] ROTARY FLOWMETER WITH VARIABLE INLET

[75] Inventors: Thomas C. Jones; Michael D. Leshner, both of Columbia, Md.

[73] Assignee: BOC Health Care, Inc., Liberty Corner, N.J.

[21] Appl. No.: 907,264

[22] Filed: Jul. 1, 1992

[51] Int. Cl.⁵ .......................... G01F 1/22; G01F 1/28
[52] U.S. Cl. ............................... 73/861.53; 73/861.76
[58] Field of Search ........... 73/861.53, 861.58, 861.72, 73/861.74, 961.75, 861.76

[56] References Cited

U.S. PATENT DOCUMENTS

| | | | |
|---|---|---|---|
| 2,385,901 | 10/1945 | Williams | 73/861.76 |
| 2,690,671 | 10/1954 | Obermaier et al. | 73/861.76 |
| 4,729,244 | 3/1988 | Furuse | 73/861.53 |

*Primary Examiner*—Herbert Goldstein
*Attorney, Agent, or Firm*—Roger M. Rathbun; Larry R. Cassett

[57] ABSTRACT

A rotary type flowmeter having a variable orifice through which the flow to be measured is directed toward a rotatable needle. A preload is also applied and which may be varied as desired. By the use of the variable orifice and with the preload, the same flowmeter may be used for differing ranges of flow by minor adjustment and various indicating scales may be taylored to the particular flow being monitored.

14 Claims, 5 Drawing Sheets

ROTARY FLOWMETER WITH VARIABLE INLET

BACKGROUND OF THE INVENTION

This invention relates to a rotary flowmeter used to measure the flow of a fluid and, more particularly, to a flowmeter that has an inlet with a variable area orifice that allows the flowmeter scale to be tailored for a particular application.

There are of course, various means of measuring and indicating the flow of a fluid. One such means involves a circular gauge having a moveable needle. The flow to be measured is directed towards one end of the moveable needle through an orifice and the fluid impinging against the needle causes it to rotate. A scale is provided that radially surrounds the needle and the needle position can be read from the scale in units of flow. Typical of such flowmeters is shown in Gauthier, U.S. Pat. No. 2,268,391. Actual movement of the needle is caused by drag force on the needle and which tends to move the needle in the direction of flow of the fluid. A return spring is provided to return the needle to its zero position when the flow of fluid has ceased and to provide a counter force opposite the drag force exerted on the needle by the flow of fluid.

A difficulty with such flowmeters relates to their principle of operation. The velocity of the fluid that exits the orifice to impinge on the moveable needle is generally linear with increasing flow, however, the drag force that moves the needle increases with the square of the velocity of the fluid that impinges on that needle. Thus, as the velocity of the fluid impinging on the needle increases, indicating increasing flow, the needle moves angularly further for the same incremental increase in flow rate, and, as a result the scale incrementation is expanded as the flow increases. That is, the scale increments are not linearly arranged radially around the needle since angular needle movement becomes more progressed at higher flows than at lower flows.

There are many applications where an increasing incrementation at higher flows is undesirable since in many instances, for the total scale movement, greater accuracy may be desired at lower flows, therefore greater incrementation or spacing is advantageous at the lower flows. Alternatively, there are instances where the overall scale is desired to be linear so that each increasing increment of flow would result in the same incremental angular movement of the needle no matter whether the overall flow is low or high.

SUMMARY OF THE INVENTION

The present flowmeter is of the type described above in which a rotary needle is moved by means of drag induced upon the end of the needle by the fluid to be measured directed within the flowmeter by an orifice.

With the present invention, however, a variable orifice is provided that automatically increases the orifice open cross-section area depending upon the differential pressure of the fluid as it passes through the variable orifice. Accordingly, the incremental velocity increase of the fluid from the variable orifice, is less at higher flows than there would be with a fixed orifice and the needle movement at those higher flows reduced. Thus, there is an increased gain at the lower indicated flows and decreased gain at the higher indicated flows, thereby tailoring the flowmeter scale, and readings, as may be desired.

In addition, by controlling, by means of a preload, the ease or difficulty of changing the orifice opening size, the overall gain can be adjusted over the entire scale.

With the present invention, therefore, by utilizing a variable orifice, the flow scale may be expanded at one extreme and compressed at the other extreme. The gain can be changed over the entire scale reading or merely at a portion thereof.

These and other objects, features and advantages of the present invention will be more readily apparent from the detailed description of the preferred embodiments set forth below taken in conjunction with the accompanying drawings.

DETAILED DESCRIPTION OF THE PREFERRED EMBODIMENT

Figure 1:
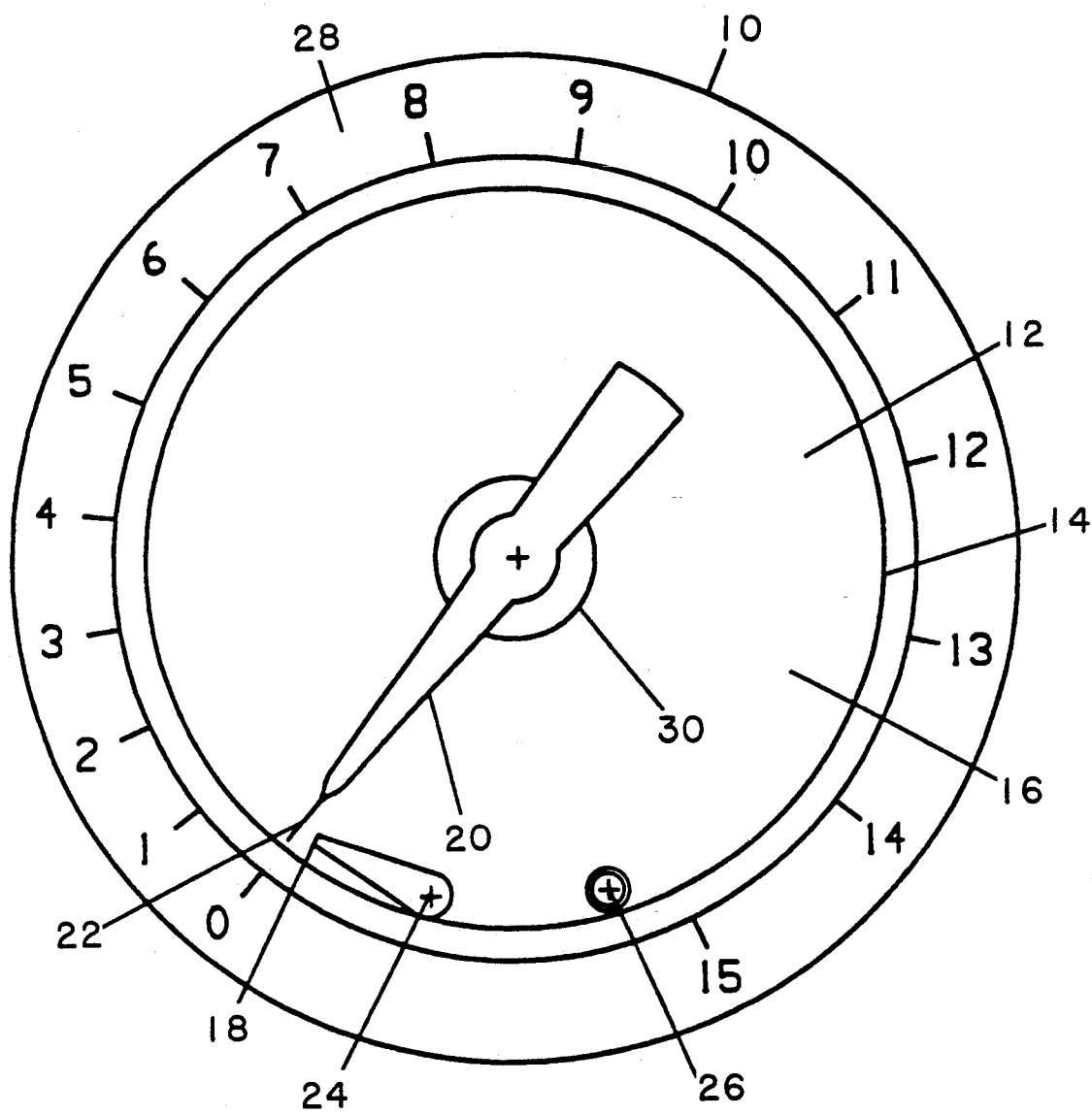
FIG. 1 is a schematic view of a typical prior art flow meter of the type used in the present invention.

Turning first to FIG. 1, there is shown a schematic view of a typical prior art flowmeter of the type related to the flowmeter of the present invention. Construction of the prior art flowmeter of FIG. 1 is similar to that shown in Gauthier, U.S. Pat. No. 2,268,391 and includes a casing 10 having a backplate 12 covered by a clear cover 14.

A metering chamber 16 is thus formed between the backplate 12 and clear cover 14 within which the fluid to be metered is allowed to flow. That fluid enters metering chamber 16 by means of a fixed orifice 18 that directs the fluid generally in a circular pattern within metering chamber 16. An indicating needle 20 is pivoted at or near the center of metering chamber 16 and has, at one end thereof, a paddle 22 that is positioned to be within the circular pattern of the flow of fluid within metering chamber 16.

An inlet 24 provides the fluid to fixed orifice 18 and an outlet 26 allows fluid to exit the metering chamber 16. Surrounding the outer periphery of the metering chamber 16 is a graphic scale 28 having numbers or other indicia so that a user can read the position of the indicating needle 20.

As can readily be seen in FIG. 1, with the indicating needle 20 in its zero position, the fluid from inlet 24 passes through fixed orifice 18 and impinges directly upon paddle 22 of indicating needle 20, thus causing the indicating needle 20 to rotate in accordance with the velocity of that fluid. The indicating needle 20 thus rotates and as its movement continues, a return spring 30 provides a return force against angular movement of indicating needle 20 opposite the force exerted by impingement of the fluid upon paddle 22.

The operation of the FIG. 1 prior art flowmeter can now be generally explained. The flow to be measured enters the flowmeter through inlet 24 where it then passes through fixed orifice 18 thereby entering metering chamber 16. Fixed orifice 18 serves to form the flow into a jet and which creates a circular pattern of moving fluid generally following the outside wall of metering chamber 16. The jet of fluid from fixed orifice 18 impinges upon the paddle 22 of indicating needle 20 to cause a drag on paddle 22 tending to rotate indicating needle 20 away from the fixed orifice 18, in a clockwise motion as shown in the FIG. 1 embodiment. The force indicated on paddle 22 is opposed by return spring 30 and the indicating needle 20 comes to rest when the force exerted by the fluid is in equilibrium with the return force exerted by return spring 30.

At that point, the graphic scale 28 can be read by the user by noting the indicia or number aligned with the paddle 22 at the end of indicating needle 20 and the flow measured.

As can be seen, however, in FIG. 1, the graphic scale 28 is not arranged radially in a linear manner, that is, as the flow increases and the indicating needle 20 moves further away from fixed orifice 18, the spacing of the scale units increases. The progressive increase is due to the principle of operation of the flowmeter. The velocity of the fluid exiting the fixed orifice 18 increases generally linearly with respect to increasing flow, however, the drag force exerted by the fluid impinging upon paddle 22 increases with the square of the impinging velocity. The return spring 30 exerts a return force on the indicating needle 20 that is generally linear with increasing angular position, that is, as the distance between the paddle 22 and the fixed orifice 18 increases. The difference between the linear return spring force and the needle drag force (velocity squared) results in scale incrementation which geometrically increases as the flow increases.

Figure 2:
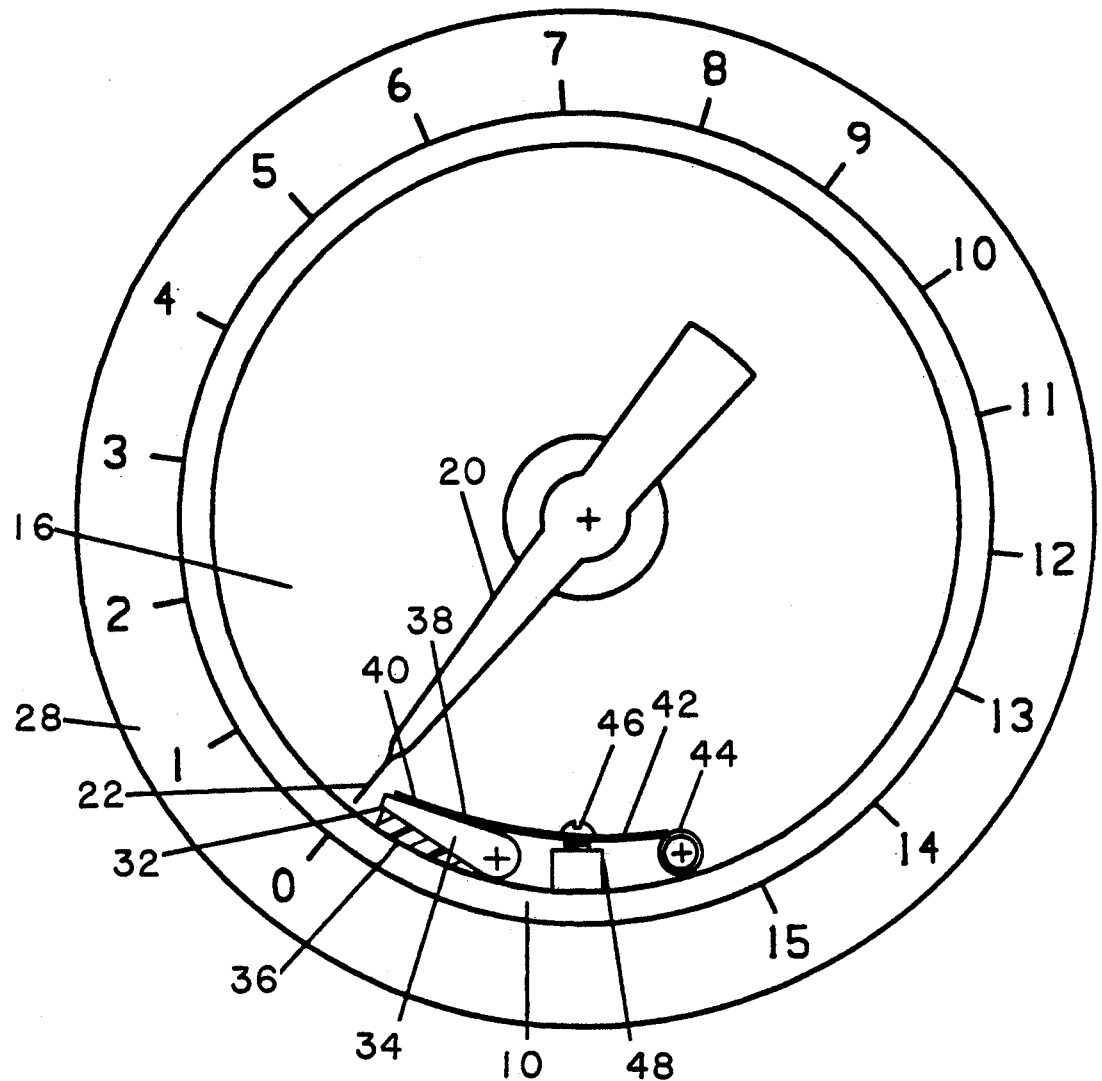
FIG. 2 is a schematic view of a flowmeter constructed in accordance with the present invention.

Turning now to FIG. 2, there is shown a schematic view of a flowmeter constructed in accordance with the present invention. In FIG. 2, a variable orifice 32 is employed and which is formed by a flexible tubing 34 that is positioned against a wedge 36 formed against the wall of metering chamber 16 and which positions flexible tubing 34 so that fluid exiting the variable orifice 32 is properly oriented. A leaf spring 38 is provided and has one end 40 acting against flexible tubing 34 and its other end 42 held in position by a stop 44. An adjusting screw 46 is positioned intermediate the one end 40 and other end 42 of leaf spring 38 and is threaded into a block 48 fixed to the casing 10 of the flowmeter. In this manner, the adjusting screw 46 may be rotated to increase or decrease the tension or preload exerted by leaf spring 38 against flexible tubing 34 so as to change the differential pressure required to vary the size of variable orifice 32.

As will be noted in FIG. 2, the graphic scale 28 is linear, that is, the same change in flow is indicated by the same angular change of the indicating needle 20, whether that change takes place at the lower end of the scale or the upper end of the scale. The reason for the linear scale in FIG. 2 as opposed to the FIG. 1 prior art scale will be understood in connection with an explanation of the operation of the FIG. 2 embodiment.

In operation, the variable orifice 32 of the FIG. 2 embodiment operates to increase the orifice opening in accordance with an increase in differential pressures across the variable orifice 32. For example, when there is no pressure differential across variable orifice 32 it is closed. As flow initially commences and is low, the pressure differential across variable orifice 32 is small since little fluid is flowing and consequently the open area of variable orifice 32 is small. The resulting fluid jet has a high velocity which in turn creates a high drag force on the paddle 22 moving the indicating needle 20 off from its zero position with a relatively small amount of flow. As flow is increased to a high flow, the pressure differential across variable orifice 32 is high and thus the open area of the variable orifice 32 is increased. As compared to the prior art fixed orifice of FIG. 1, the velocity increase impinging on paddle 22 is thus less with a variable orifice than the velocity increase corresponding to the same incremental increase of flow with the fixed orifice. Thus graphic scale 28 may, if desired, retain linear readings, that is, the same incremental increase or decrease of flow would result in the same angular movement of the indicating needle regardless of whether that change occurred at relatively high or low flows.

In addition, the angular location of any particular scale increment can be changed by adjusting the amount of differential pressure required for a specific change in open orifice area. By rotating the adjusting screw 46, more or less preload or tension can be applied to the flexible tubing 34. As the adjusting screw is tightened, thereby increasing preload on the variable orifice 32, the indicia or numbers on the graphic scale 28 rotate away from variable orifice 34. For example, if adjusting screw 46 were tightened to increase the preload, the location of a specific scale representation i.e., number indicating flow, would move clockwise. Thus if, for example, a full scale previously read 0-5 liter/min. over full scale, by increasing preload, that same full scale could be adapted to 0-3 liter/min. Therefore, the same flow meter can be used for different flow ranges without need to change the orifice or make any difficult mechanical modifications. It is only necessary to rotate adjusting screw 46 to change the preload on the variable orifice 32. Conversely, if graphic scale 28 reads 0-3 liter/min. full scale, by lessening the preload on variable orifice 32, thus making it open wider for the same pressure differential, the graphic scale 28 could easily be change to 0-5 liters/min. full scale. Thus, by relatively easy changes, the geometry as well as the angular position of the flowmeter scale can be adapted to the flow characteristics for whatever flow is being measured.

Figure 3:
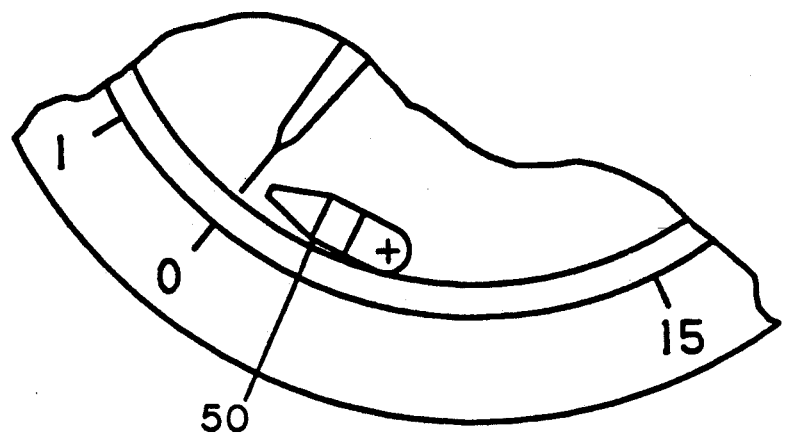
FIG. 3 is a cutaway schematic view of an alternative embodiment of the flowmeter constructed in accordance with the present invention.

Turning now to FIG. 3, there is a schematic view of a still further embodiment of the subject invention and where a simple elastic part commonly known as a duck bill valve 50 serves as the variable orifice. The elastic nature of the duck bill valve 50 provides the preloading and is itself a variable orifice that increases its opening responsive to an increase of differential pressure through duck bill valve 50. An adjustable spring, not shown, may also be added to duck bill valve 50 to fine tune the scale.

Figure 4:
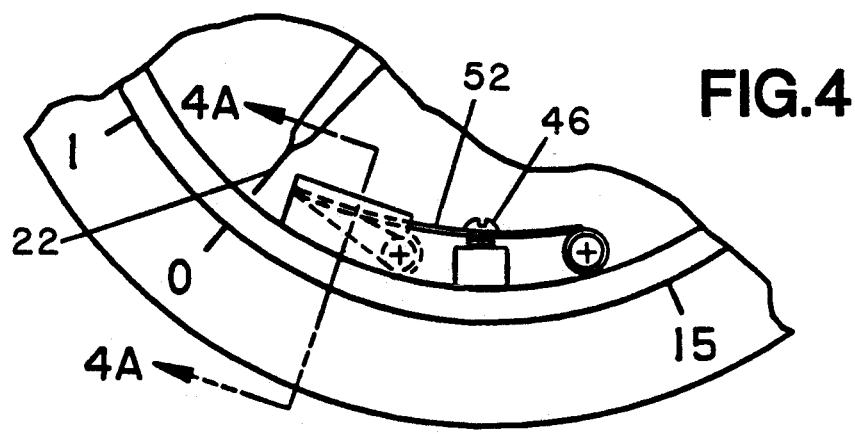
FIG. 4 is a cutaway schematic view of a still further embodiment of the flowmeter of the present invention.
Figure 4A:
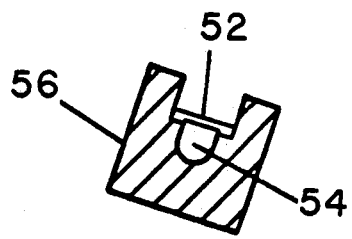
FIG. 4A an enlarged cross-sectional view of an inlet of FIG. 4 taken along the lines AA of FIG. 4.
Figure 4B:
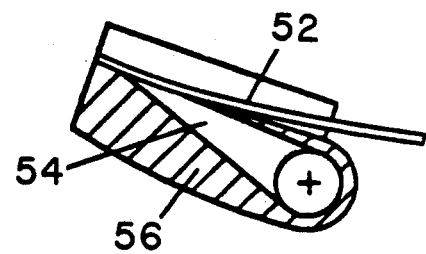
FIG. 4B is an enlarged cross-sectional view of the inlet used in the FIG. 4 embodiment.

Turning now to FIG. 4, there is shown, a schematic view of a further variable orifice useable with the subject invention. In this embodiment, a leaf spring 52 covers a specially shaped opening 54 in a block 56. Note FIGS. 4A and 4B. To insure sealing, the leaf spring 52 may be coated with a resilient sealing material such as a silicone rubber or synthetic elastomer. As noted, particularly in FIG. 4A, leaf spring 52 covers the shaped opening 54 thereby normally closing opening 54 when there is no flow therethrough. As flow is increased, leaf spring 52 opens and the opening size is dependent upon the differential pressure across that variable orifice. The FIG. 4 embodiment otherwise operates in the same manner as the FIGS. 2 and 3 embodiments. Again, the gain can be adjusted by rotation of the adjusting screw 46 to increase or lessen the preload on leaf spring 52.

Figure 5:
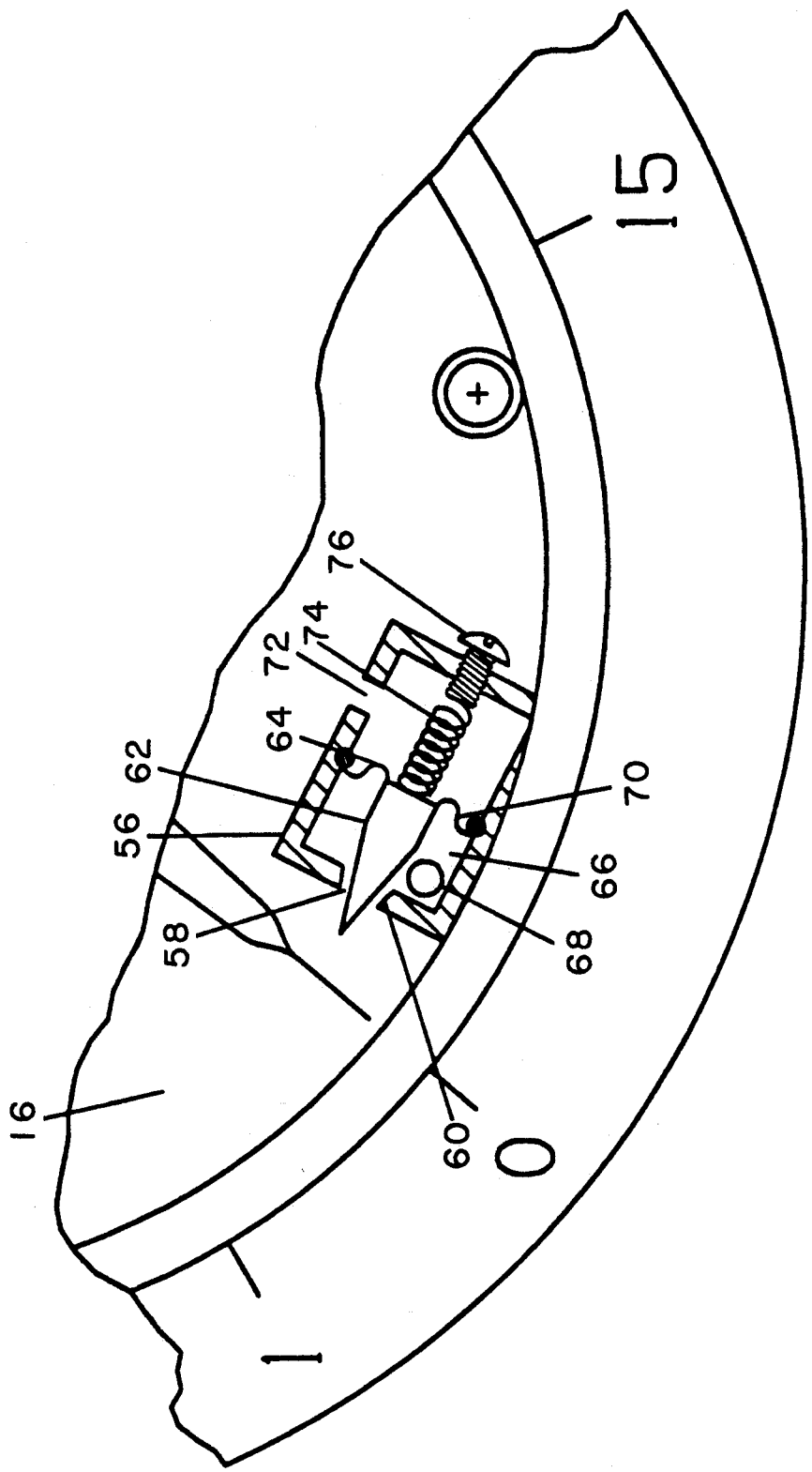
FIG. 5 is a cutaway schematic view of a still further embodiment of the present invention.

Turning now to FIG. 5 there is shown a schematic, partly broken away, of a still further embodiment of the subject invention. In this embodiment, a housing 56 is located within or adjacent to metering chamber 16 and has a variable opening 58 formed therein. Fluid passing through variable opening 58 is directed in the same circular pattern around the outer periphery of metering chamber 16 as with the previous embodiments. The variable opening 58 is formed by means of a seat 60 formed in housing 56 and a needle 62 that moves with respect to seat 60 to change the open area of variable opening 58. Needle 62 is affixed to a diaphragm 64 forming an inlet chamber 66 into which the inlet 68 communicates. Thus, the inlet chamber 66 is isolated, to most extents, from the pressure in the metering chamber 16. The exterior surface 70 of diaphragm remote from inlet chamber 66 is open to the pressure within metering chamber 16 through an opening 72. A spring 74 preloads the needle 62 toward seat 60 and the amount of such preload may be varied by adjusting screw 76 threadedly affixed to housing 56.

The operation of the FIG. 5 embodiment may now be explained. When there is no pressure differential across the variable opening 58, that is, the pressure in inlet chamber 66 is equal to the pressure in the metering chamber 16, the spring 74 holds needle 62 against seat 60; thus variable opening 58 is closed. When there is a small pressure differential across the variable opening 58, the diaphragm 64 moves the needle 62 toward spring 74, thus increasing the open area or widening the variable opening 58, again, making the variable orifice roughly proportional to flow. At high flows, the pressure differential on opposite sides of diaphragm 64 is also high, thus moving the diaphragm 64, and needle 62 along with it, away from seat 60, thus the variable opening 58 is open to a considerably wide area for flow from inlet 68.

Figure 6:
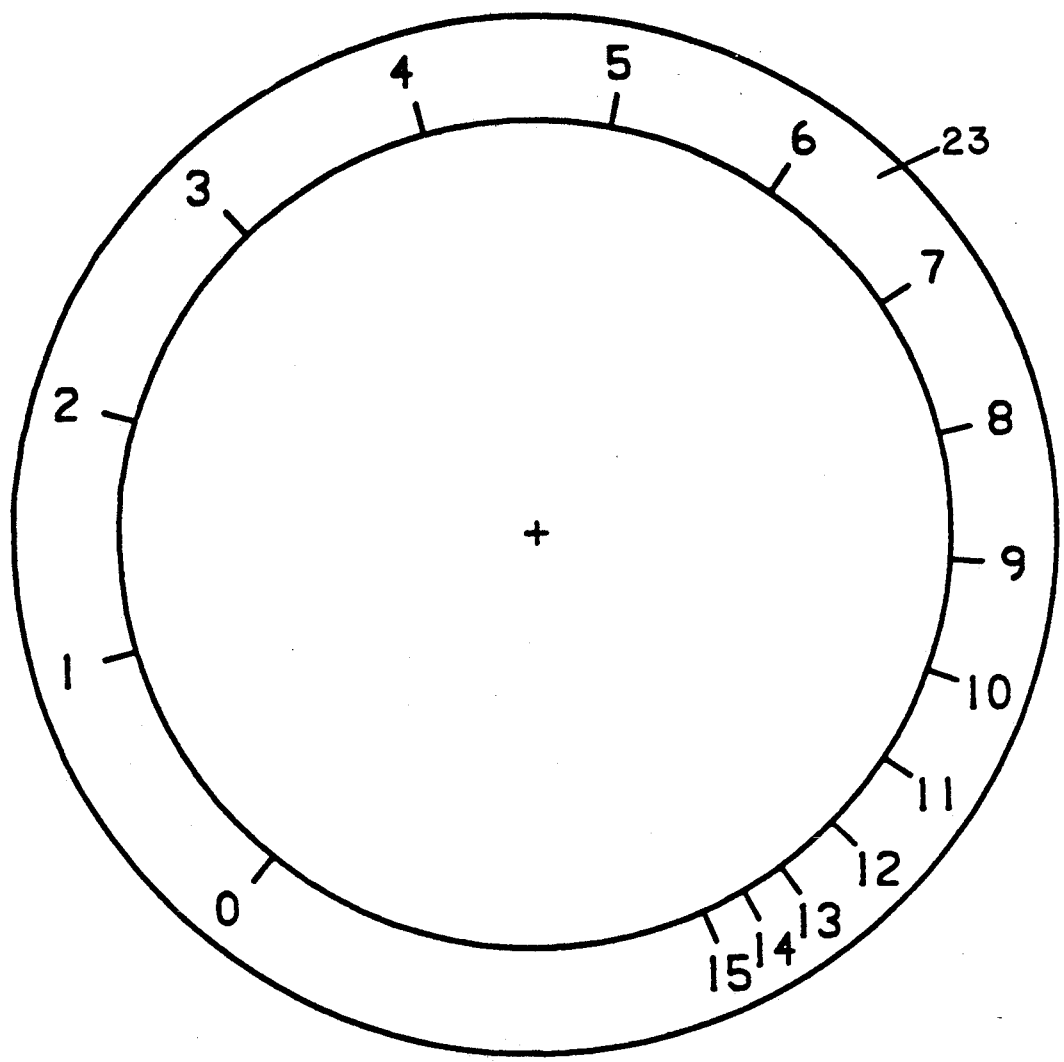
FIG. 6 is a schematic view of a scale that can be used with the flowmeter of the present invention.

Finally, turning to FIG. 6 there is shown a schematic view of a graphic scale 28 that may be used in connection with the present invention. As will be noted in graphic scale 28, the spacing between numbers indicating flow decrease geometrically at the higher flows. This configuration of scale may be achieved by adjusting the preload on the variable orifices described with respect to FIGS. 2-5. In operation, with a small amount of preload, the scale may be similar to that of FIG. 2, wherein the numbers are spaced in a generally linear pattern and the same increments are represented by the same angular degree change of the needle. As also explained, with a low preload, the flowmeter scale can accurately measure higher flows for a given angular needle movement. As the preload is increased, the flow range for the flowmeter is reduced and as the preload is increased beyond a certain amount, the upper range of flow indicators begins to compress, that is, geometrically reduce the increments of needle movement for the same incremental change in flow.

Accordingly, with the use of the variable orifice and the preload that changes the amount of pressure differential required to change the open area of that variable orifice, the scale of the flowmeter can be varied almost as desired. Hence, the same flowmeter may be used for a wide range of flows and with varying sensitivity with respect to the lower or higher ranges of such flows with only a very simple and easy adjustment to the flowmeter. The flowmeter is therefore very versatile and can serve a wide range of uses.

It will be understood that the scope of this invention is not limited to the particular features or embodiments disclosed herein, by way of example, but only by the scope of the appended claims.

I claim:

1. A flowmeter for indicating the flow of a fluid, said flowmeter having a housing, a needle moveably affixed to said housing, variable orifice means having an opening with a variable cross-sectional area positioned in said housing to direct the flow of the fluid to impinge upon the moveable needle to move said needle responsive to the effect of the velocity of the fluid impinging on said needle, means responsive to the pressure differential of the fluid as it passes through said variable orifice means to vary the cross-sectional area of said opening to control the velocity of the fluid impinging on said needle.

2. A flowmeter as described in claim 1 wherein said variable orifice means comprises a duck-bill valve.

3. A flowmeter as described in claim I wherein said variable orifice comprises a flexible tubing and a spring means biasing said flexible tubing to close said tubing and wherein a change in the differential pressure across said variable orifice means varies the opening of said flexible tubing against the bias.

4. A flowmeter as described in claim 3 further including adjustment means to vary the force the spring means exerts against said flexible tubing.

5. A flowmeter as described in claim 1 wherein said variable orifice comprises a tapered channel having a flexible leaf spring covering said channel, said flexible leaf spring normally closing said tapered channel, said flexible leaf spring being responsive to changes differential pressure across said variable orifice to vary said said tapered channel in relation to the change in differential pressure.

6. A flowmeter for indicating the flow of a fluid, said flowmeter comprising a needle pivotable about a point, said flowmeter having an inlet for receiving the fluid and an outlet for discharging the fluid and a variable area orifice interposed between said inlet and said outlet through which the fluid passes, said orifice causing a difference in pressure of the fluid as it passes therethrough, and said orifice further directing the fluid to impinge on said needle to pivot said needle about said point in relationship to the effect of the velocity of the fluid impinging on said needle, means responsive to the difference of pressure in the fluid passing through said orifice to vary the cross-sectional area of said orifice to thereby control the velocity of fluid impinging on said needle.

7. A flowmeter as defined in claim 6 wherein said variable orifice comprises a duck bill valve.

8. A flowmeter as defined in claim 6 wherein said variable orifice comprises a flexible member having an opening through which said fluid passes and a spring means biasing said flexible member to its closed position and wherein a change in the differential of the fluid passing through said flexible member varies the opening through which the fluid passes.

9. A flowmeter for measuring the flow of a fluid comprising:

a casing;

a moveable needle affixed to said casing and being pivotable about a point;

a transparent cover affixed to said casing and enclosing said needle within a metering chamber;

said metering chamber having an inlet and an outlet;

a variable area orifice formed within said chamber and through which said fluid flows in passing between said inlet and said outlet, resulting in a differential pressure of the fluid passing through said orifice; said variable area orifice further directing the fluid to impinge upon at least a portion of said moveable needle to move said needle in accordance with the effect of the velocity of fluid impinging thereon; and means responsive to the differential pressure of fluid passing through said orifice to change the area of the orifice to thereby change the velocity of the fluid impinging upon said at least a portion of said moveable needle.

10. A flowmeter as described in claim 9 wherein said variable orifice comprises a housing located proximate to said metering chamber, said housing having an opening for directing fluid toward said needle and a needle valve member movable with respect to said opening to open and close said opening and means to communicate the differential pressure across said variable orifice to cause said needle to move whereby said needle opens and closes said opening responsive to changes in the differential pressure across said variable orifice.

11. A flowmeter as described in claim 10 wherein said housing includes a spring means biasing said needle valve member toward its closed position.

12. A flowmeter as defined in claim 11 wherein said housing includes an adjustment means to vary the bias of said spring means.

13. A method of controlling the velocity of fluid impinging upon a moveable needle of a flowmeter measuring the flow of a fluid:

providing an inlet in the flowmeter for receiving the fluid to be measured;

providing an outlet for discharge of the fluid after being measured;

directing the fluid passing through the flowmeter through an orifice intermediate said inlet and said outlet to impinge upon the moveable needle to move the needle in response to the velocity of the fluid;

detecting the pressure differential of the fluid as it passes through the orifice; and changing the area of the orifice opening in response to the pressure differential of the fluid therethrough to thereby change the velocity of the fluid impinging on the moveable needle.

14. A method as defined in claim 13 wherein said step of changing the area of the orifice comprises opening and closing the opening of a valve.

* * * * *